Patented Oct. 31, 1922.

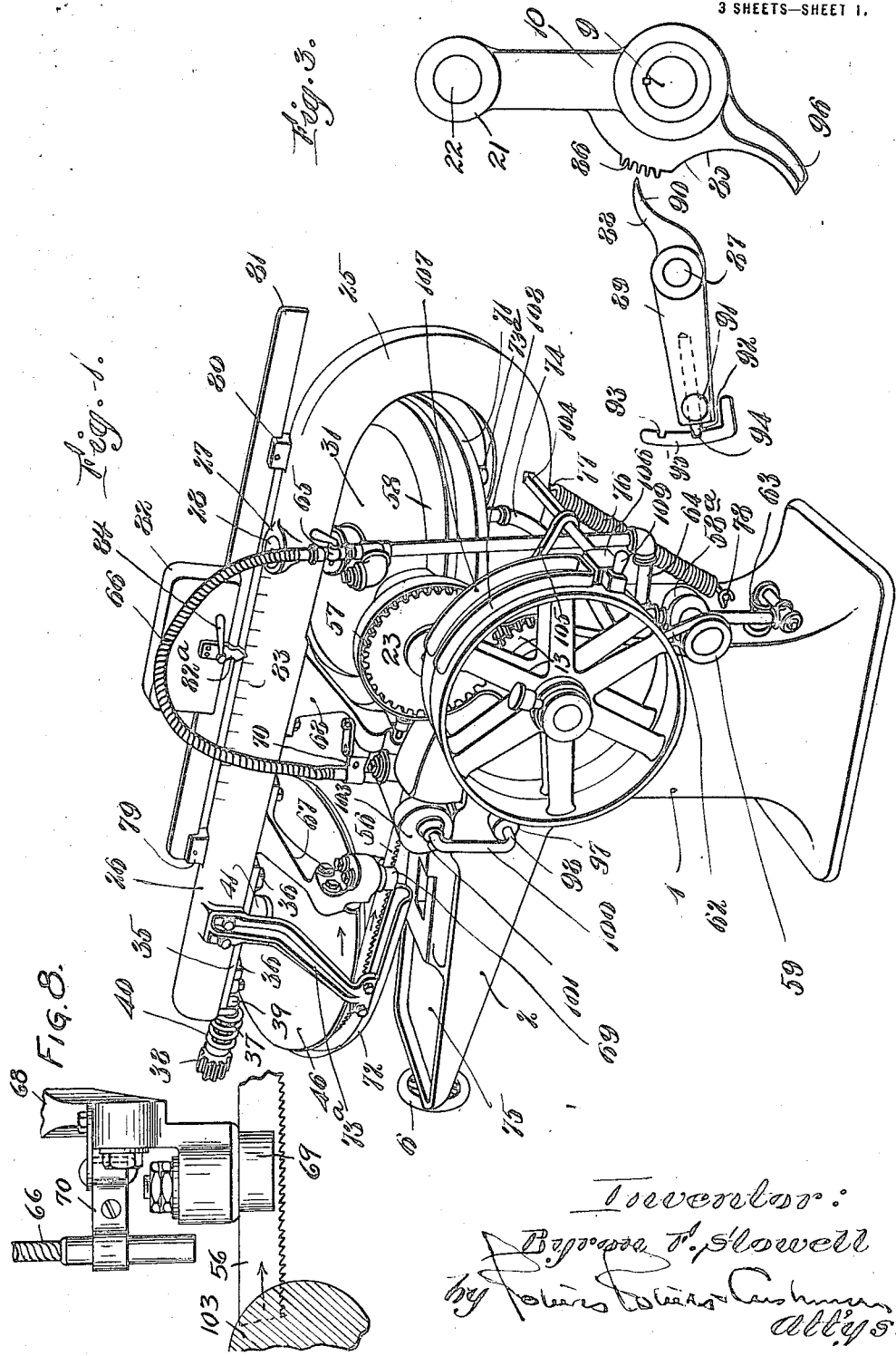

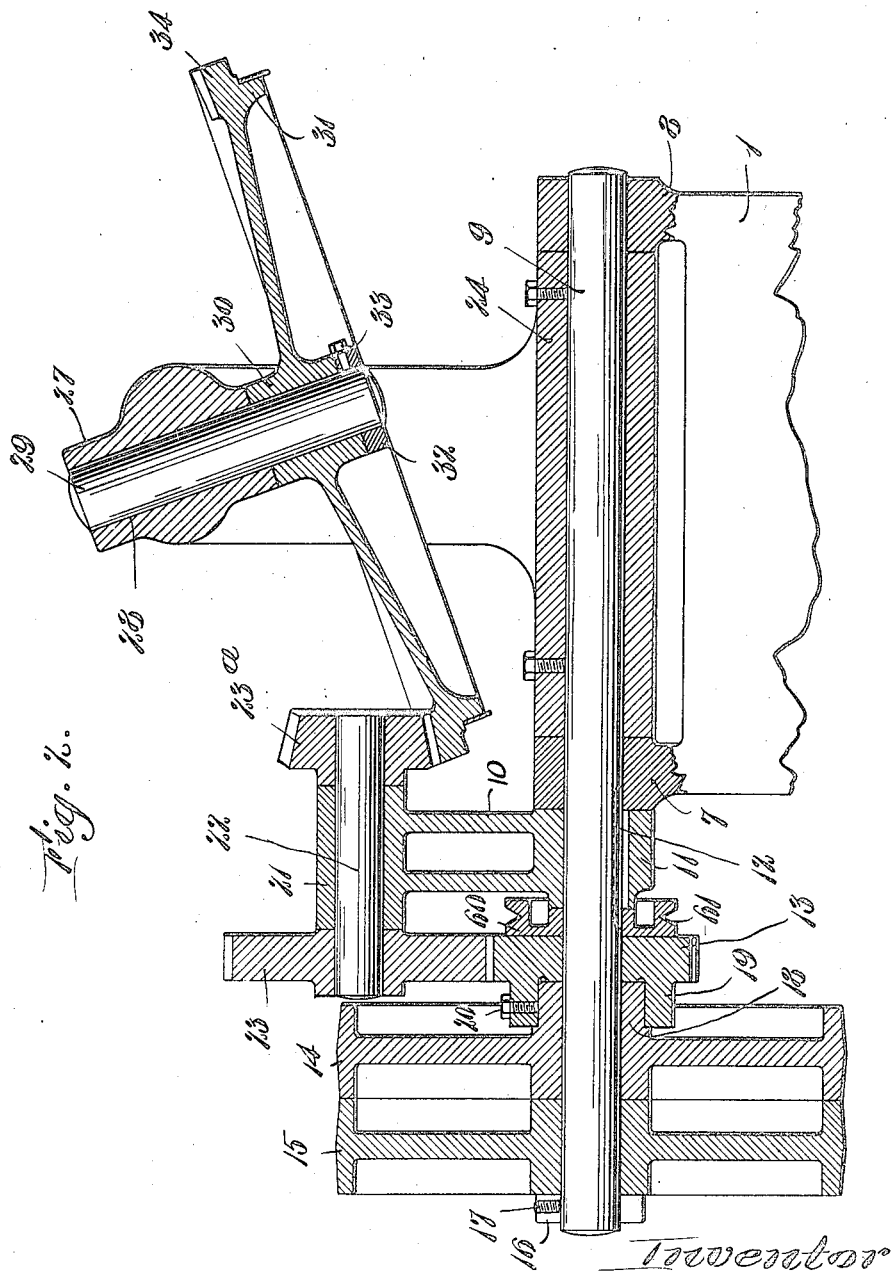

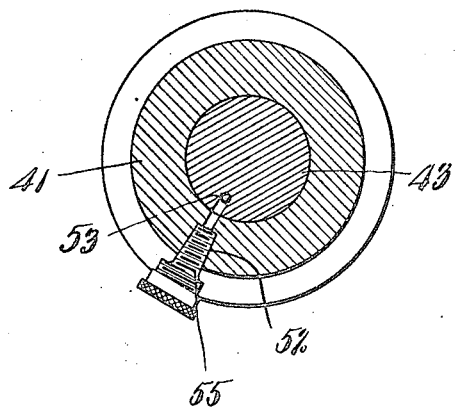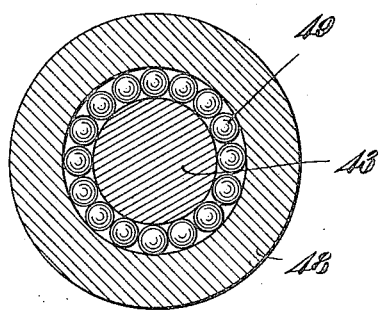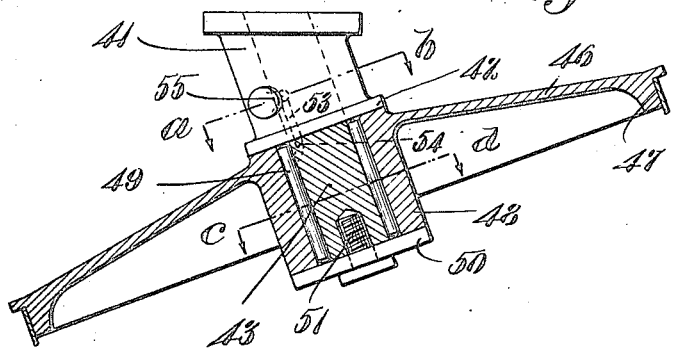

1,434,235

UNITED STATES PATENT OFFICE.

BYRON F. STOWELL, OF SPRINGFIELD, MASSACHUSETTS, ASSIGNOR TO METAL SAW AND MACHINE CO. INC., OF SPRINGFIELD, MASSACHUSETTS, A CORPORATION OF MASSACHUSETTS.

DRIVING AND CONTROL DEVICE FOR BAND-CUTTER-CUTTING MACHINES.

Application filed April 23, 1921. Serial No. 463,981.

*To all whom it may concern:*

Be it known that I, BYRON F. STOWELL, a citizen of the United States of America, and resident of Springfield, in the county of Hampden and State of Massachusetts, have invented new and useful Improvements in Driving and Control Devices for Band-Cutter-Cutting Machines, of which the following is a specification.

This invention concerns machinery for working metal, wood or other material, of that type wherein a driven instrumentality is arranged for movement relatively to the material to be operated upon in order to determine operative action on such material, and more especially to the actuating and guiding means for such instrumentality and to the parts and mechanisms associated therewith.

The invention in certain of its aspects, at least, is useful in connection with and may be embodied in any machine of the above type, whatever the operative instrumentality may be, an instrument of this genus being hereinafter referred to as a cutter. For purposes of illustration of one preferred embodiment of the invention, the present specification will be devoted to the description of a specific instance of the invention as applied to a band-saw machine for cutting metal.

In a desirable type of such machine, the endless band-saw blade is mounted upon a frame which is pivoted near one of its extremities to swing about a fixed axis whereby to approach the operative run of the saw to the material to be cut, such material being supported in a suitable work-vise or holder. Means is also provided for driving the saw in all positions of the supporting frame, as well as for lubricating the operative run of the saw and for regulating the cutting pressure between the edge of the saw and the work. The driving of the saw in performing its cutting function requires the continuous and uninterrupted application of power in considerable amount in all positions of the supporting frame during the feeding of the saw through the material while the regulation of the cutting pressure or rate of feed and the stopping of the feed movement of the saw when the cut has been completed, should for effective operation, be adequately provided for. Machines of relatively large capacity and providing the desired features as above pointed out have heretofore been devised, and while they are in certain instances, very effective for the purpose intended, have been of complicated character, costly to produce and install and occupying considerable floor space. Such machines have been found very useful in the handling of large quantities of work, or where the cost of installation is warranted by steady use of the large capacity of the machine, but in the smaller establishments, where production is limited or occasional, and where first cost and floor space required are of relatively great importance, such prior machines are not economically justified.

A principal object of the present invention is to overcome certain of the insufficiencies and defects common to band-saw machines of the prior art and in particular to provide a machine of a compact character such as shall occupy but relatively small floor space; to provide simple and effective means for driving the band-saw blade in all positions of the saw carrying frame, to provide means for properly lubricating certain of the operative elements of the machine, including the saw-blade; to provide simple means for stopping and starting the machine and for positioning the material to be cut; to provide effective means for regulating the cutting pressure of the saw-blade; and in general to provide a machine of relatively low initial cost capable of doing in an efficient manner work such as heretofore has commonly been done only by the relatively expensive and complex devices.

To this end the embodiment of means illustrated in the accompanying drawings may be employed, in which:—

Figure 1 is a perspective view from the right-hand side of the machine illustrating the saw-carrying frame as in operative position;

Fig. 2 is a fragmentary transverse cross section taken on the vertical plane passing through the axis of the main drive pulley of the machine;

Fig. 3 is a fragmentary detail view in side elevation, and to enlarged scale, illustrating features of the saw frame retaining device;

Fig. 4 is an axial cross section through one of the saw-guiding wheels of a modified form;

Fig. 5 is a cross section on the line a—b of Fig. 4;

Fig. 6 is a cross section on the line c—d of Fig. 4;

Fig. 7 is a fragmentary side elevation illustrating features of the work-holding device and the work-positioning member, and Fig. 8 is a detail, side elevation, to large scale, showing the delivery end of the lubricating conduit and the supporting bracket therefor.

Referring to the drawings, the base of the machine is indicated at 1, such base having a forwardly directed table 2, such table being provided at its upper side with a work-supporting surface 3. At the rear of such surface is arranged a fixed clamping jaw 4 (see Fig. 7) and cooperating with such jaw is a movable jaw 5. The jaw 5 is slidably guided upon the surface 3 and may be adjusted toward and from the jaw 4 by means of a hand wheel 6 operating any desired or ordinary means not shown, whereby clamping movement may be imparted to the jaw 5.

Projecting upwardly from the base member 1 and at the rear portion thereof are a pair of lugs or brackets 7, 8 respectively, said brackets being provided with aligned openings in which is journalled a shaft 9. A bracket 10 comprising a sleeve portion 11 engaging the shaft 9, is secured upon said shaft as by means of a key 12, such sleeve portion engaging the outer surface of the ear 7. The shaft 9 projects beyond the sleeve 11, and has freely mounted thereon a pinion 13. A drive pulley 14 and idler pulley 15 are also mounted to turn upon the outer end of the shaft 9, the pulley 15 being retained upon the shaft by means of a collar 16 secured thereto by means of a set screw 17 or in other desired manner. The hub 18 of the pulley 14 is connected to the hub of the pinion 19 in any desired manner, as for example by providing the hub 19 with an internal bore for the reception of the hub 18, the parts being secured together by means of a set screw 20 passing through the hub 19 and engaging the hub 18.

The bracket 10 extends upwardly from the shaft 9 and is provided at 21 with a bearing opening for the reception of a short rotatable shaft 22. Upon one end of such shaft 22 is secured a pinion 23 which meshes with the pinion 13 and is driven thereby. Upon its opposite end the shaft 22 is provided with a fixed bevelled gear 23, serving as the immediate drive for the cutter means. Supporting, tensioning and driving means for the cutter means are mounted on shaft 9 as herein described. Secured to and retaining the shaft 9 between the brackets 7, 8 is a sleeve member 24, formed as an integral part of the cutter-carrying frame comprising the curved portion 25 and the longitudinally extending and substantially straight portion 26. The straight portion of such frame overlies the work support and preferably extends in a direction substantially perpendicular to the axis of the shaft 9.

The member 26 of the frame is provided with stub shafts for the driving and idler wheels for a band cutter; for instance the arm may comprise a boss 27 having an internal bore 28 in which is fixed a stub shaft 29, such stub shaft being preferably inclined to the vertical plane of the frame comprising the members 25, 26 and having its axis intersecting the axis of the shaft 9. Upon the lower end of the stub shaft 29 is mounted to turn freely the hub 30 of a saw-guiding and driving wheel 31. This wheel may be retained upon the shaft 29 in any desired manner, as for example by means of a collar 32 secured to the end of the shaft by means of a set screw 33. Fixed to the wheel 31 and integral therewith if desired is a bevel gear 34, such bevel gear meshing with the bevel gear 23 above described and receiving movement of rotation therefrom.

Adjacent its free extremity the frame member 26, which may be cast hollow for lightness, is provided with a bracket member for the stub shaft for idler wheel 46, such bracket comprising a plate 35 which slidably engages the lower face of the member 26. This bracket member is arranged for adjustable tensioning motion longitudinally of the member 26, being provided with elongated slots (not shown) with which engage bolts such as 36, such bolts taking into threaded openings in the member 26. For tensioning the bracket, the latter has secured thereto a rod 37 which is screw threaded at its outer end for the reception of a manually adjustable nut 38. Interposed between such nut and a fixed abutment 39 carried by the frame member 26, is a coiled spring 40. Projecting downwardly from the plate 35 is a boss or bracket member 41 which may be secured to such plate in any desired manner, or formed integrally therewith. The bracket 41 is preferably of substantially circular cross section and is inclined to the vertical plane in such manner as to have its axis parallel to that of the shaft 29. The bracket 41 terminates in a radial flange 42, and projecting axially from the lower face of said flange is a stub shaft 43 which may be formed integrally with the bracket if desired. A saw-guiding pulley is indicated at 46, such pulley having a rim 47 for engagement with the saw blade and having a hub 48 which is journalled upon the shaft 43. The bearings between the shaft 29 and the wheel 31, and the shaft 43 and wheel 46 may be ordinary bearings, as shown in Fig. 2, but preferably there are interposed between the hub and the stub shaft for one or both wheels,—as shown in Fig. 4 for hub 48 and the shaft 43, a series of anti-friction bearings such as the rollers 49. The upper end of the hub 48 engages the flange 42, while its lower end is covered by a plate 50, which is secured to the shaft 43 as by means of a bolt 51. The bracket member 41 is provided with an internally screw-threaded opening 52, leading to a longitudinal channel 53, such channel at its lower end terminating at the peripheral surface of the shaft 43, as indicated at 54. Secured in the opening 52 is a force-feed lubricator or grease cup 55 of any usual and desirable type, such grease cup serving to feed a lubricating medium from within the bearing, through the channel 53, so that chips, etc., will flow out of the bearing with the lubricant forced out of its spaces.

An endless band-saw blade 56 is indicated as engaging the wheels 46 and 31, respectively, such saw blade being driven by its engagement with the wheel 31 and being guided and tensioned by the wheel 46. The tension of the saw blade may be adjusted at will by manipulation of the nut 38, it being evident that such tension is a resilient tension owing to the interposition of the spring 40 between the rod 37 and the fixed abutment.

For guarding and protecting the pinions 13, 23 and the gear 23$^a$ the bracket 11 may be provided with a fixed gear-case or guard member 57, and for enclosing and guarding the teeth of the wear 34 a gear case 58 may me secured to the frame 25, 26 in any desired manner.

A pump 58$^a$ of any desired form is indicated as mounted upon the base member 1, such pump herein being shown as of the rotary type and provided with a drive pulley 59. Fast to the inner face of the pinion 13 is a belt pulley 60 having a groove 61 for engagement with a belt or band 62, such belt or band passing around the pulley 59 and serving to actuate the pump 58$^a$. Within the hollow base 1 of the machine is arranged a tank (not shown) from which extends the suction pipe 63 leading to the pump 58. From the pump 58 extends the delivery pipe 64 which may, if desired, be provided with a shut off valve at 65. Leading from such valve is a flexible conduit 66, which terminates at a point adjacent that portion of the saw blade which is in engagement with the material to be cut. For guiding the saw blade adjacent the cutting point a pair of brackets such as 67, 68 are secured to the member 26 of the saw frame, such brackets serving respectively to support pairs of rolls such as 69. These pairs of rolls are arranged in such manner as to guide the active run of the saw in a substantially vertical plane, perpendicular to shaft 9, to keep the active run of the saw in the plane of its feeding motion. To one of such brackets, as for instance the bracket 68, may conveniently be secured a support 70 for the delivery end of the conduit 66. In the preferred arrangement the conduit 66 will deliver at a point adjacent that end of the cut from which the saw emerges and at which the saw teeth would ordinarily be at the highest temperature. The delivery of oil at this point also serves effectively to clean the chips from the saw teeth.

Arranged beneath the saw-guiding wheels 31 and 46, a receiving trough having curved ends 71, 72 under the respective wheels is supported in any desired manner as for example by means of brackets such as 73, 73$^a$ carried by the saw frame. Leading from the end 71 of the trough a return pipe 74, which is curved concentrically with shaft 9, extends downwardly through a hole in base 1 and delivers into the receptacle or tank within the base of the machine. With this arrangement lubricating medium which clings to the saw will be returned through the pipe 74 to the tank. The upper portion of the base may also be provided with an oil-collecting receptacle such as 75 provided with a passage or conduit leading to the tank for returning to the tank the remaining delivery from conduit 66, the end 72 of the trough, and drippings from the saw or work at points intermediate the ends of the troughs 72, 72.

For counterbalancing a part of the weight of the frame member 26 and the parts supported thereby, there is provided a spring 76, one end of such spring being secured at 77 to the member 25 of the frame and the other end being secured to the base member 1. Projecting upwardly from the frame member 26 are a pair of spaced lugs 79, 80, and secured to said lugs is a guide rail member 81. An adjustable weight 82 is arranged to slide longitudinally of the rail 81, and to such weight is fixed an index 82$^a$ for graduations 83 on member 26, to indicate adjustments of the weight 82 corresponding to desired feeding pressures for the saw. A suitable clamping device for the weight, comprising the operating handle 84 may be provided.

That portion of the bracket member 11 which surrounds the shaft 9 is provided with a flange member 85 (see Fig. 3) having a series of ratchet teeth 86 in its edge. Pivoted on a pin 87 fixed in the base member 1, is a lever 89 having an arm 88 terminating in a dog 90 to engage the teeth 86. This arm carries a spring-pressed locking bolt 92 and handle 91, to engage with either of a pair of notches 93, 94, respectively, in a fixed abutment 95 projecting outwardly from the base member 1. The bracket 11 may also be provided with a stop arm 96.

At a point below the work-supporting surface 3 of the base member 2, in a bore in boss 97, a sliding and rotatable work-gauge rod 98 bent upward at 100 and inward at 101 is adjustably fixed by means of a set screw 99. In Figs. 1 and 7, a piece of work, indicated as a round bar 103, is shown as resting upon the work-supporting surface 3 and secured between the clamping jaws 4, 5, the end of such bar 103 bearing against the gauge 100, by which the length of material to be cut off by the saw may be accurately determined, the permissible adjustment of the stop member 102 in an angular, as well as in a rectilinear direction, providing for its proper positioning for cooperation with work of any form or size.

A belt shipper rod 104 is arranged to slide in openings in the member 25 and in a bracket 105 secured to the bracket 11. The rod 104 carries a block 106 to which is secured a belt shifter fork 107, 108, and a handle 109.

The operation of the machine will now be apparent: The drive belt is so arranged that the pulleys 14, 15 run clockwise as viewed in Fig. 1, the tension run of the belt being to the left. Recalling that bracket 10 is fixed to the shaft 9, it will be apparent that the forces tending to hold the frame 25 down are, when the belt is on the drive pulley, opposed by the tendency of the bracket 10 to rotate with the driving pinion on pulley 15. This tendency depends upon the power transmitted through the gears on bracket 10, which in turn varies with the resistance encountered by the cutter, increasing if the cutter pulls heavily and decreasing when the cutter is little opposed.

If now the weight 82 is adjusted to hold the cutter and frame 25 downward with a normal pressure, and assuming the dog 90 to be free of teeth 86, and the material to be cut to be clamped on table 2, the operator lowers the saw into contact with the material, and can then leave the machine. The feeding pressure on the cutter of the over-balanced arm 25 and weight 82, less the normal drag on the cutter reacting through the delivery train, tends to feed the saw through homogeneous material at the proper rate. But any obstruction such as a hard spot, clogging of the cutter, or absence of lubricant, greatly increases the drag on the driving train, and proportionally increases the lifting movement on arm 25. The downward forces acting on arm 25 are made light enough to yield before destruction strain be brought on the cutter, which will rise when the drag upon it is sufficient to overcome the downward force of weight 82; and which will return toward the work when the drag ceases or diminishes.

This capacity of the mechanism automatically adjusts the feeding force to the nature of the work, permitting the cutter pressure automatically to decrease for difficult cutting, without any alteration by the operator except an adjustment of weight 82 appropriate to the general kind of work, and the entended maximum feeding pressure on the cutter.

The downward limit of motion of the frame 25 may be fixed by any appropriate stop, such as trough 7 striking table 2, and the upward motion of the arm may be limited by the arm 96 striking a stop on base 1, such as the hub of lever 88.

Handle 91, dog 90, and teeth 86 provide means for locking the frame up in any position to permit adjustment of the material to be cut.

I do not herein claim the invention common to this application and to my application for band cutter cutting machines, Serial No. 463,980, filed April 23, 1921.

I claim:

1. A material working machine having a support for the material, an instrumentality operative for working the material, means for producing working pressure between said instrumentality and the material, and driving means for said instrumentality automatically operative to regulate such pressure in accordance with the resistance of such material to working by said instrumentality.

2. A material working machine having a support for the material, an instrumentality having a material cutting element, and means for producing working pressure between said element and the material and for actuating said element, said actuating means being constructed and arranged automatically to relieve the pressure between the material and said element upon the occurrence of undue resistance to the actuation of the latter.

3. A material working machine having thereon a support for the material, a material working instrumentality, means tending to move said instrumentality toward the material, means for actuating said instrumentality, means for supporting said instrumentality in part by a force derived from the actuating means whereby to permit it to be engaged with the material, and automatically acting means for regulating said force to change the pressure between the material and said instrumentality when so engaged.

4. A material working machine having a support for the material, a material working implement, a movable support for said implement, means tending to press said implement with a predetermined pressure against the material, and means for applying actuating force to said implement so constructed and arranged that a component of the applied force tends to decrease said pressure.

5. A material working machine having a pivoted support, an operative instrumentality mounted on said support, and means for applying actuating force to said instrumentality, said means being so constructed and arranged that a component of the applied force normally tends to swing said support about its pivot.

6. A material working machine having therein a work support, a cutter carrying frame pivoted to swing about a fixed axis, a cutter and a cutter driving element on said frame, means tending to move the frame toward the work support, a drive connection concentric with said fixed axis, and means for transmitting power between said drive connection and cutter driving element adapted variably, in accordance with the power transmitted, to oppose the force tending to move the frame toward the work support.

7. A material-working machine having therein a work support, a cutter carrying frame pivoted to swing about a fixed axis, a cutter and a cutter driving element on said frame, adjustable means tending to move the frame toward the work support with a definite force, a drive connection for said cutter driving element having an element rotative upon said axis and an element movable with said frame for transmitting power between said drive connection and cutter driving element, the direction of the driving force variably, in accordance with the power transmitted opposing the force tending to move the frame toward the work support.

8. A material working machine having therein a work support and a material working instrumentality movable toward and from the same, adjustable means for determining initial pressure between said instrumentality and work mounted on said support, and means for actuating said instrumentality so constructed and arranged as to relieve the pressure between said instrumentality and the work upon the occurrence of excessive resistance to operation of such instrumentality.

9. A material working machine comprising a swingable frame, an implement mounted thereon, a support for material toward and from which said instrumentality may be moved, a weight slidable longitudinally of said frame for adjusting the initial pressure between the implement and the work, and power driven means for actuating said implement so constructed and arranged as to tend to swing said frame with the implement away from the material.

10. A sawing machine having a work support, a pivotally supported saw frame movable toward and from the work support, a saw mounted on said frame, and means for applying driving force to said saw in all positions of the frame, said means being so constructed and arranged that upon the occurrence of undue resistance to the movement of the saw, said frame will tend automatically to swing away from the work-support.

11. A material working machine having therein a work support, a cutter carrying frame pivoted to swing about a fixed axis, a band cutter and cutter driving and supporting elements on said frame, means tending to move the frame toward the work support with a constant force, a drive pulley and a drive connection driven by said pulley concentric with said fixed axis, and means on said frame for transmitting power between said drive connection and cutter driving element, the direction of motion of the drive connection being such as variably, in accordance with the resistance encountered by the cutter to oppose the force tending to move the frame toward the work support.

12. A material-working machine having therein a work support, a cutter carrying frame pivoted to swing about a fixed axis, a band cutter and cutter driving and supporting elements on said frame, means tending to move the frame toward the work support with a constant force, a drive connection concentric with said fixed axis, and gearing rotatable on axes fixedly related to said frame for transmitting power between said drive connection and cutter driving element, whereby a component of the driving force opposes, in accordance with the resistance to motion of the driven parts carried by the frame, the force tending to move the frame toward the work support.

13. A material-working machine having therein a work support, a cutter carrying frame pivoted to swing about a fixed axis, a band cutter and a cutter driving wheel on said frame, positioned to drive the cutter in a plane inclined to the motion of the frame, means to hold the portion of the cutter in contact with the work in the plane of its pivotal motion, means tending to move the frame toward the work support about said axis, a drive connection concentric with said axis, and gearing supported by the frame for transmitting power from said drive connection to said cutter driving wheel, the direction of drive being such as to oppose the force tending to move the frame toward the work support.

14. A material working machine having therein a base member, a work support, a swinging frame and a material working instrumentality thereon movable toward and from the same, adjustable means for determining initial pressure between said instrumentality and work mounted on said frame, intermeshing gearing having elements rotative on said base member and elements rotative on said frame for driving said instrumentality, and so constructed and arranged as to relieve the pressure between said instrumentality and the work upon the occurrence of excessive resistance to operation of such instrumentality.

15. In a material working machine, a support, a shaft mounted thereon, a cutter supporting frame fixed to said shaft to swing about the axis thereof as a pivot, a cutter carried by said frame, a drive pulley free on said shaft, and means including intermeshing gears respectively rotating on said shaft and on said frame for transmitting movement from said pulley to said cutter in all positions of the frame, and counterbalance means on the frame for normally overcoming the tendency to swing the frame due to reaction between said gears.

16. A material working machine having therein a base member, a work support thereon, a shaft mounted to turn on said base member, a cutter supporting frame fixed to said shaft to swing about the axis thereof, a cutter driving wheel carried by said frame, a drive wheel on the shaft, a plurality of intermeshing gears for transmitting motion from the drive wheel to said cutter driving wheel in all positions of the frame, and means for so rotating said drive wheel that a component of the driving force tends constantly to swing said frame in a direction away from the work support.

17. A material working machine comprising a support, a shaft thereon, a cutter carrying frame secured to said shaft, an implement actuating gear wheel rotatably mounted upon the frame, a bracket secured to said shaft, a pinion free to turn said shaft, and transmission means carried by said bracket for transmitting movement from said pinion to said gear wheel.

18. A material working machine comprising a support, a shaft journalled therein, a cutter supporting frame fixedly secured to said shaft to swing about the axis thereof, a cutter actuating gear wheel mounted upon said frame to turn about an axis intersecting that of said shaft, a bracket secured to the shaft, a short shaft journalled in said bracket, a gear fixed on said short shaft meshing with said gear wheel, a pinion fixed on said short shaft, a pinion loosely journalled on said first shaft and meshing with said first named pinion, and a drive pulley fast to said second pinion.

19. A band saw machine comprising a saw supporting frame swingable about a fixed axis, a saw guiding and driving wheel mounted upon said frame, a bevel gear fast to said wheel, a bracket movable with said frame about the axis thereof, a shaft journalled in said bracket, a bevel gear fast to said shaft and meshing with said first bevel gear, a pinion fast to said shaft, a second pinion meshing with said first pinion, and guard devices carried by said frame and bracket for enclosing the toothed portions of said gears and pinions.

20. A machine of the class described having a cutter and a work support, said support comprising a vise having fixed and movable jaws, a stop member, and adjustable supporting means for said stop member constructed and arranged to permit movement of such stop member in planes at right angles to each other, one of said planes being perpendicular to the path of movement of said movable jaw.

21. A band-saw machine having a saw supporting frame, a bracket arranged thereon, a stub shaft projecting downwardly from said bracket and provided with a longitudinal passage leading to the peripheral surface of the shaft, a saw guiding wheel journaled on said shaft, antifriction bearings interposed between the pulley and shaft, and a force feed lubricating device secured to said bracket and communicating with the upper end of said passage for delivering lubricant under pressure to said channel.

22. A band-saw machine having therein a support provided with a circular, radial flange, a stub shaft projecting downwardly and axially therefrom, a saw guiding pulley provided with a hub turnable about said shaft, one end of the hub engaging said flange, a series of roller bearings interposed between said shaft and hub, means engaging and covering the opposite end of the hub, and means mounted upon said support and above said flange for forcing lubricant into the interior of said hub.

23. A sawing machine comprising a support for material to be cut, a saw supporting device, a band-saw blade mounted thereon, means for imparting operative movement to the saw blade, and means for applying a lubricating medium to the saw blade adjacent that point where it emerges from the material.

Signed by me at Springfield, Massachusetts, this 31st day of March, 1921.

BYRON F. STOWELL.